US012688202B2

(12) United States Patent
Bierner et al.

(10) Patent No.: US 12,688,202 B2
(45) Date of Patent: *\*Jul. 21, 2026*

(54) DATA-SHARDING FOR EFFICIENT RECORD SEARCH

(71) Applicant: Ancestry.com Operations Inc., Lehi, UT (US)

(72) Inventors: Gann Bierner, Oakland, CA (US); Robert Weis, Oakland, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 2 days.

This patent is subject to a terminal disclaimer.

(21) Appl. No.: 19/008,354

(22) Filed: Jan. 2, 2025

(65) Prior Publication Data

US 2025/0139126 A1 May 1, 2025

Related U.S. Application Data

(63) Continuation of application No. 17/871,427, filed on Jul. 22, 2022, now Pat. No. 12,222,963.

(60) Provisional application No. 63/225,246, filed on Jul. 23, 2021.

(51) Int. Cl.
*G06F 16/27* (2019.01)
*G06F 16/22* (2019.01)
*G06F 16/25* (2019.01)

(52) U.S. Cl.
CPC ............ *G06F 16/278* (2019.01); *G06F 16/22* (2019.01); *G06F 16/254* (2019.01)

(58) Field of Classification Search
CPC ....... G06F 16/278; G06F 16/22; G06F 16/254
See application file for complete search history.

(56) References Cited

U.S. PATENT DOCUMENTS

| | | | |
|---|---|---|---|
| 12,222,963 B2 * | 2/2025 | Bierner ................... | G06F 16/22 |
| 2012/0179684 A1 * | 7/2012 | Alba ..................... | G06F 16/328 |
| | | | 707/738 |
| 2016/0203174 A1 * | 7/2016 | Shahane ............. | G06F 16/2228 |
| | | | 707/803 |
| 2017/0103116 A1 | 4/2017 | Hu et al. | |
| 2017/0132276 A1 | 5/2017 | Saurabh et al. | |
| 2017/0235809 A1 | 8/2017 | Chawdhuri et al. | |
| 2017/0300490 A1 | 10/2017 | Kachemir et al. | |
| 2018/0060037 A1 * | 3/2018 | Johnson ................... | G06F 7/08 |

(Continued)

OTHER PUBLICATIONS

U.S. Appl. No. 17/871,427, Aug. 30, 2023, Office Action.

(Continued)

*Primary Examiner* — Jensen Hu
(74) *Attorney, Agent, or Firm* — Keller Preece PLLC

(57) ABSTRACT

Data-sharding systems and/or methods for cost- and time-efficient record search are described. Data-sharding embodiments utilize a name-sharding dimension, optionally in combination with one or more additional dimensions such as record type and year, to reduce latency and reduce search-associated costs. The data-sharding systems and methods embodiments utilize an optimization algorithm to determine a distribution of records related to names. The optimization algorithm may use a three-character prefix for surnames in records to distribute shards across documents, with specific shards relating to no-name and multi-name records allocated.

20 Claims, 12 Drawing Sheets

(56)           References Cited

U.S. PATENT DOCUMENTS

| | | | |
|---|---|---|---|
| 2018/0300385 A1 | 10/2018 | Merriman et al. | |
| 2018/0314750 A1* | 11/2018 | Merriman | H04L 67/1097 |
| 2019/0129935 A1 | 5/2019 | Bostick et al. | |
| 2019/0354637 A1 | 11/2019 | Ivancich et al. | |
| 2020/0250163 A1* | 8/2020 | Kuimelis | G06F 16/2255 |
| 2020/0327150 A1* | 10/2020 | Kunjur | G06F 16/2468 |
| 2021/0271364 A1 | 9/2021 | Ghassabian | |
| 2022/0358917 A1* | 11/2022 | Chaland | G06F 3/167 |
| 2022/0382752 A1 | 12/2022 | Yadav et al. | |
| 2023/0017352 A1 | 1/2023 | Mishra et al. | |

OTHER PUBLICATIONS

U.S. Appl. No. 17/871,427, Dec. 21, 2023, Office Action.
U.S. Appl. No. 17/871,427, Apr. 24, 2024, Office Action.
U.S. Appl. No. 17/871,427, Dec. 5, 2024, Notice of Allowance.

* cited by examiner

PRIOR ART

PRIOR ART

900A

1000

Receive a Collection of Data
1002

Extract At Least One Searchable Field from the Collection
1004

Transform the Extracted Field
1006

Assign a Prefix Based on the Transformed Field
1008

Use Optimization Algorithm to Generate Distribution
1010

Index the Data to a Plurality of Shards Using the Distribution
1012

Search Only Pertinent Shards Upon Receiving a Query
1014

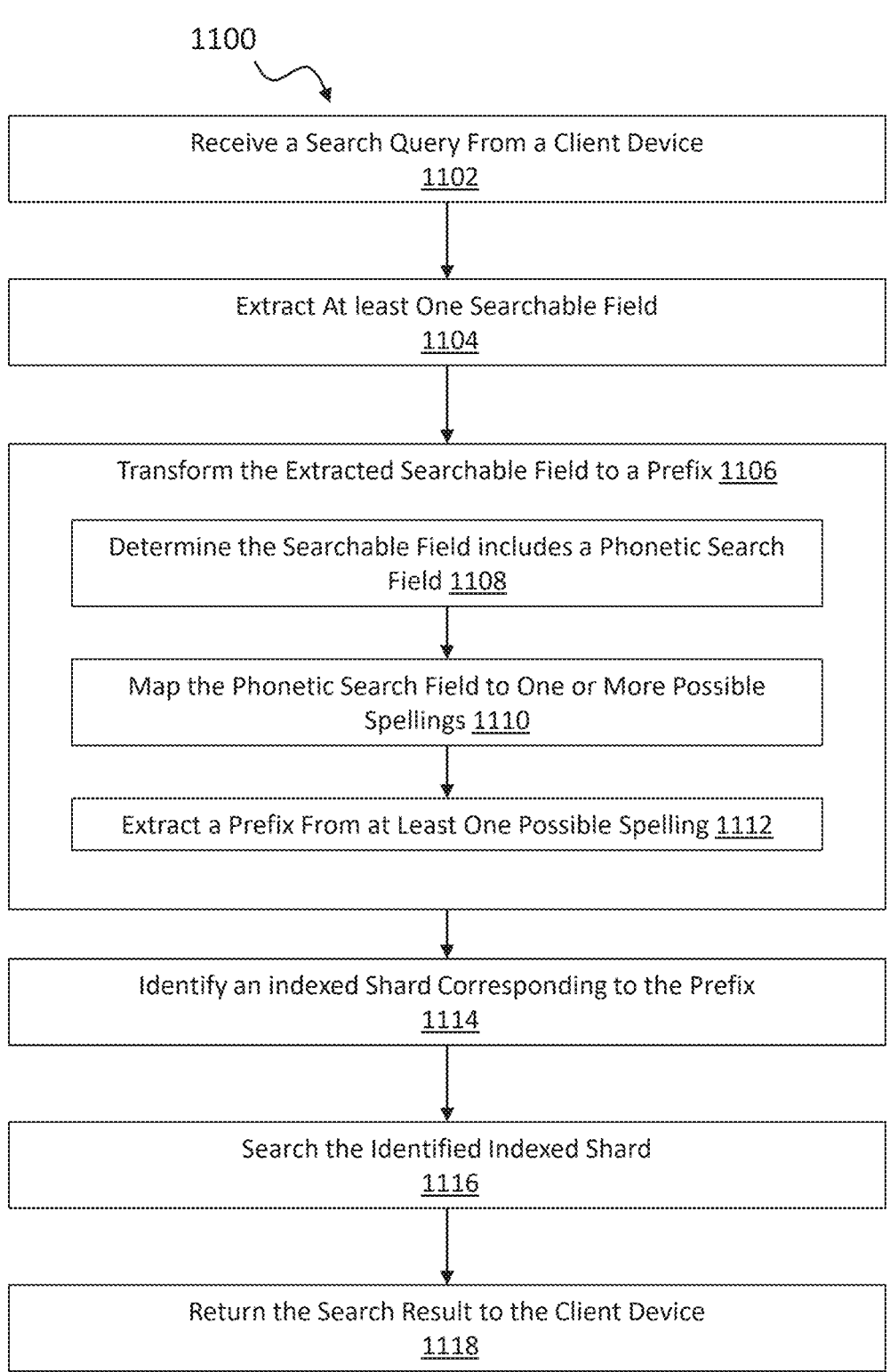

1100

Receive a Search Query From a Client Device
1102

Extract At least One Searchable Field
1104

Transform the Extracted Searchable Field to a Prefix 1106

Determine the Searchable Field includes a Phonetic Search Field 1108

Map the Phonetic Search Field to One or More Possible Spellings 1110

Extract a Prefix From at Least One Possible Spelling 1112

Identify an indexed Shard Corresponding to the Prefix
1114

Search the Identified Indexed Shard
1116

Return the Search Result to the Client Device
1118

*FIG. 11*

DATA-SHARDING FOR EFFICIENT RECORD SEARCH

CROSS-REFERENCE TO RELATED APPLICATION

The present application is a continuation of U.S. application Ser. No. 17/871,427, filed on Jul. 22, 2022, which claims the benefit of and priority to U.S. Provisional Patent Application No. 63/225,246, filed on Jul. 23, 2021. Each of the aforementioned applications are hereby incorporated by reference in their entirety.

FIELD

The disclosure relates to facilitating and conducting data sharding in databases for more time- and cost-efficient record searches.

BACKGROUND

The amount of data handled by modern companies, which have an increasingly large and international footprint, is constantly increasing as companies collect, store, and use data in novel ways. With larger volumes and complexity of data, including both structured and unstructured data, enterprise search costs, including the cost of accessing specific information from storage modalities such as databases in a timely and efficient manner, have expanded enormously. The compute and memory requirements associated with searching a large database can be crippling even for large companies. Moreover, providing accurate search results in a timely manner to customers or users of the database is extremely important.

The volume of data handled by different companies may range from less than a terabyte ("TB") up to an average value of many hundreds of TB, with many companies having petabytes and exabytes of data. Moreover, the volume of data acquired and stored by companies is expected to increase by double-digit percentages year over year. For example, family history repositories may comprise tens of billions of historical records.

Another challenge with data management is the phenomenon of "dark data," i.e., data that is obtained and stored by a company but not used or understood. Some estimates place the proportion of data that is unused by the entity that acquires it at approximately 55%, meaning that most data that is collected is unutilized. Many companies with such data indicate that such data is unutilized because there is too much data to handle and/or because only structured data can be accessed.

In view of the foregoing, there is a need for an improved method of managing and searching a database that improves efficiency and cost while improving search speed.

SUMMARY

Embodiments of data-sharding systems and methods for time- and cost-efficient record search advantageously address the limitations of existing solutions by facilitating sharding in a novel dimension. In some embodiments, the data-sharding systems and methods facilitate automatic sharding of a database, data collection, and/or server in a plurality of dimensions, the sharding in a plurality of dimensions yielding time and cost savings over existing approaches and solutions. In some embodiments, the systems and methods facilitate sharding by name as a new logical dimension. In some embodiments sharding by name is performed in addition to one or more other, existing logical dimensions.

In some embodiments, the systems and methods of the disclosure perform sharding of a record index on each of three different dimensions: record type, year, and name. Sharding had been performed previously on record type and year, with records being randomly distributed across a number of shards, e.g., 50, required to host all of the data. Consequently, the final dimension (i.e. names) was randomly distributed across the servers, and each shard had an equal chance of hosting the correct record. As such every search for or including a specific name was required to query at least 50 shards in the best-case scenario. While 50 shards have been described, the number of shards may be proportional to the volume of content and may vary as the volume of content and/or the storage capacity of the shards increases or decreases.

By contrast, the data-sharding systems and methods of embodiments advantageously utilize a novel sharding dimension, in some embodiments the novel sharding dimension being name sharding and in some embodiments the novel sharding dimension being a third sharding dimension, to organize records or other data according to, e.g., record type, year, and then surname, notated as _surname_. Each shard is now responsible for a range of surnames arranged, in some embodiments, alphabetically. Alternatively, the surnames may be organized in other suitable manners, such as using a hash assigned based on a relation of the surname to a record type. The surname refers to the surname of the main person of interest in a historical record, i.e. the "self" or "ego" surname. In certain family history embodiments, this surname is not extended to relatives such as spouse(s), children, parents.

Surname may be particularly useful as it is present in most historical records, but it will be appreciated that the disclosure is by no means limited to surname-only sharding or to historical records, and alternative and/or additional name-related or other fields or data types may be used. Given names or surnames for a self or for relatives are contemplated. Alternatively, or in addition, a primary place or other metadatum of the document, e.g., the country or state level, may be used. In some embodiments, any suitable combination of any number of fields such as record type, year, surname, first name, birthplace, birth date, death place, death date, marriage place, marriage date, or otherwise may be utilized. In some embodiments unrelated to family history and historical records, any suitable combination of sharding dimensions may be utilized.

In some embodiments, only dimensions that apply and are relevant across all collections and/or are frequently queried are used for sharding. In other embodiments, separate indexes are created for each collection using dimensions pertinent to each collection. For example, in collections of United States Federal Census records, "occupation" can be a useful sharding dimension, particularly if occupation is commonly queried for Census record collections. The occupations may be arranged alphabetically, categorically, or according to any suitable arrangement.

Sharding may be performed based on any suitable field, for example record creation year, record publication year, record author or subject, record agency or organization, record status, record language, record geographical origin or location, record field of study or work, etc. Sharding may be performed on calculated metrics, for example upon a calculated lifespan range for which a document or record is relevant. Records would then be distributed among shards based on the frequency of queries. Records may also be distributed such that the number of records is relatively constant across all shards. In some embodiments, such that the shards are evenly queried—accordingly, individual shards would host relatively fewer or a lower density of records with larger lifespan ranges and/or relatively more or a higher density of records with shorter lifespan ranges. Other calculated metrics may be used, alternatively or additionally, as suitable.

In yet further embodiments, the sharding may be performed based on places noted in a record. Thus, for example, a collection corresponding and sharded according to Texas Marriage Records from a certain year range could be sharded according to places noted within the Marriage Records, such as "Harris County" vs. "Brazoria County" and so forth or "Houston" vs. "Galveston" and so forth, as the case may be, to allow for further logical partitioning of records facilitating searches that avoid querying shards that do not contain relevant information.

In some embodiments in which records are sharded according to surname, the first shard is responsible for names starting with "a" and ending with "arn," the next shard is responsible for names starting with "arn" and ending with "bel," and so forth. Thus, instead of having to search all 50 servers, now the collator can choose which shards contain relevant records, reducing the number of queries applied to the cluster. The minimum number of shards queried is advantageously reduced from, for example, 50, to one. In some embodiments where a query hits multiple record types and year values, multiple shards may still be searched, but less than the total number of shards. This reduces the total number of shards that must be searched.

This advantageously reduces the load on most of the shards, and by consequence those shards need not be scaled as much or at all, resulting in massive cost savings without compromising the speed of search. Rather, in addition to the cost savings, search speed is surprisingly improved by as much as 40%. It has been further surprisingly found that the existing servers are, as a result, more powerful than necessary, allowing for additional reductions in cost by adjusting the size of the servers.

A pre-processing step or engine of the data-sharding systems and methods, according to some embodiments, includes providing content to the search engine. In some embodiments the search engine is Apache Solr, and the content is provided in the form of "collections," which may include a set of records from a particular source. While Apache Solr is described, it will be appreciated that embodiments may be carried out on or in cooperation with alternative search modalities, including but not limited to Elasticsearch™, Algolia™, Coveo™, Yext™, Azure™ Search, IBM™ Watson Discovery, Google™ Cloud Search, Swiftype™, combinations and/or modifications thereof, or any other suitable modality.

The collections may be, as an illustrative example, the 1940 United States Federal Census, the 1950 U.S. Census, or Texas Marriage Records. The search engine must process the records of the collections into a form that can be indexed, in what is known as the Extract stage and the Transform stage of embodiments. In order to also shard the records by surname, the distribution of names may be ascertained. In some embodiments this includes keeping track of name frequencies. This allows for splitting the records as evenly as possible across shards. This advantageously reduces costs by minimizing the cost of the machines themselves and maximizing the efficiency of the searching operation as it queries pertinent shards. During the Transform stage, names may be normalized.

To initialize the data collection and storage process, each document of a pertinent collection is analyzed to extract surnames from a person of interest, e.g., from a "self," as opposed to a spouse, parent, child, or other relation. The surname of the person of interest is saved as a three-character prefix to a database table. While three-character prefixes have been described, it will be appreciated that any suitable hash, such as a two-character, four-character, five-character, or other-sized prefix may be alternatively used. In some embodiments, a MapReduce implementation is utilized, which advantageously facilitates parallel processing of records in a collection. MapReduce is mentioned as an exemplary embodiment, but the disclosure is by no means limited thereto. Upon identifying a record that does not have a self surname or where multiple and/or conflicting self surnames are recorded, this is recorded in the database table, for example as "no name"—or as "multiple name"—type entries.

Because the process of extracting and saving prefixes of identified surnames is time-consuming, an additional component is added so that the process of analyzing and storing pertinent indexing information from collections is performed incrementally as new collections are published. Whereas in some embodiments the collections in a database may each be analyzed, and the corresponding frequencies may be stored in the database, in other embodiments the Transformer incrementally updates frequency data whenever a collection gets updated. In some embodiments, the Transformer saves the name prefix to an output file along with other dimensional data like record type and primary year, then a separate process takes the dimensional data and inserts the same into the database.

When an index is about to be created for a particular searchable combination of collections, e.g., 1800-1850 in combination with marriage records (e.g. marriage records pertaining to the years 1800-1850), surname three-character prefixes are extracted from the database for each of the first two dimensions, in some embodiments in or from Solr collections. Such collections include, for example, birth records from 1910-1950, death records from 1880-1895, etc. The surname prefixes corresponding to each of the first two dimensions, i.e. record type and record year, are used as input to an optimization algorithm that produces a definition of what surnames each shard in each Solr collection is responsible for. This step also allocates some shards to records with no names and records with multiple surnames. The surnames may be normalized exactly or substantially the same as the search for standardization. For example, normalization processes, such as removing accents or other special characters from a name, and/or transliterating or simplifying non-standard or special characters or alphabets, allow for accurate determination of name prefix frequencies, and improved distribution of records on shards. For instance, certain alphabets in foreign languages may be transliterated, and/or certain special characters may be simplified to standard English characters, such as, but not limited to, the eszett in German. This advantageously avoids different parts of the systems and methods embodiments determining that the record belongs in different shards.

That is, a sharding index of surname prefixes may be determined as described herein for each possible combination of additional or foregoing sharding dimensions. In family history embodiments, a sharding index of surname prefixes is determined for each combination of record type and year that may be searched and according to which records are already sharded. In other embodiments where distinct sharding dimensions are used, a third or additional dimension may be indexed according to each possible combination of foregoing sharding dimensions. While embodiments in which surname sharding is performed after sharding according to record type and year, it will be appreciated that the disclosure is not limited to this embodiment. Rather, surname sharding may precede any other suitable sharding dimension such as record type and/or year.

In an alternative embodiment, the optimization algorithm separately indexes records with multiple surnames according to each of the multiple surnames. Such records could, in such embodiments, be stored redundantly on different shards so as to be searchable thereon according to one of the multiple names. An example of a record with multiple surnames is the surname Smith-Jones. In other embodiments, a record may have conflicting information about surnames such that a single surname cannot be determined with certainty, for example indicating Smith in some regards and Jones in other regards or otherwise conflicting because of, for example, user corrections/additions, or optical character recognition ("OCR")-related errors and uncertainties.

During the indexing process, there is a specific MapReduce component, the Partitioner, that assigns records to specific shards within a Solr collection. Whereas in previous approaches the Partitioner assigned the records randomly to different shards, a new Partitioner has been created to utilize the sharding definitions obtained as an output from the optimization algorithm described above. Using the sharding definitions, the new Partitioner assigns records to shards not randomly but rather according to an improved distribution that utilizes the existing shards in more time- and cost-efficient manner.

For example, the Partitioner may distribute the surname prefixes to different shards to achieve an even distribution (i.e. each shard contains approximately the same number of entries) based on frequency of content or frequency of queries, as determined using an optimization algorithm as described herein. To this end the Partitioner may target a certain number of records per shard. The Partitioner may distribute the records such that each shard has within ±1% of the number of records of the average value. In some embodiments, single-name shards are maintained within a threshold variance such each of the single-name shards having within ±1% of the number of records of the average or median value for single-name shards, while multi-name shards and no-name shards are separately partitioned. In some embodiments, the maximum and/or minimum value of the records stored on the shards is determined so that outliers can be identified and rectified. The normalized distance to mean may be used to determine the variance between shards.

That is, a record is first passed through the same process that it would go through before the final indexing, including tokenization in which the surname is broken up into pieces and any requisite or suitable transformations, such as removal of diacritics, transliteration from other alphabets, adding similar names, etc. Based on the result of the above-described process, a final result may be: the record is determined to have no name and is therefore randomly assigned to a "no-name" shard; the record is determined to have one name and is assigned to the shard corresponding to a range that includes the one name; or the record is determined to have more than one name, wherein if all of the multiple names would get assigned to the same shard if processed separately, the record is assigned to the same shard corresponding to the names, and wherein if all of the multiple names would not get assigned to the same shard if processed separately, the record is randomly assigned to one of the "multi-name" shards. The indexing process can be a parallelized process with numerous jobs occurring simultaneously across the shards.

The database may be updated as a collection is updated with new data. The existing collection is deleted entirely from the index and then records from the updated collection are added to the index one at a time. This advantageously replaces the previous process in which new records were added to the shards randomly; by contrast, the new records are added to an appropriate name shard, thereby allowing the depicted embodiments of data-sharding systems and methods to accommodate updated data. The embodiments of data-sharding systems and methods may determine, upon data being uploaded or stored, whether the data is a new collection entirely or an updated version of an existing collection.

The above-mentioned procedures advantageously facilitate an improved retrieval process. When a search query is received, the search engine must decide which shards to query. As before, any information about record type and years (from the query) can be used to narrow down the number of Solr collections to search. The data-sharding systems and methods of embodiments provide a new engine for choosing which shards within a particular Solr collection to search. The surname in the received search query is sent through a process analogous to the above-described process (i.e. tokenization and other suitable transformations), and then processed against name shard definitions as described below:

If the query does not include a surname, all shards are searched.

If the query has a surname and the query requires that the surname be matched exactly as specified, only the shard containing that surname (as determined using the name shard definitions) and any shards with multi-name records are searched.

If the query is searching for a surname using wildcards, in some embodiments all shards other than no-name shards are searched. In some embodiments, the shards searched depend upon the exact value of the wildcard surname. For example, if the search is for "A*," only shards with names that start with "A" need to be searched.

If the query has a surname and requests phonetic matches (i.e. "sounds like" matches), all shards other than no-name shards are searched. In some embodiments, each index may be analyzed for possible phonetic variants of a search query identified during the indexing process such that only those shards containing possible phonetic variants need be searched when a user searches for phonetic matches.

In some embodiments, for each shard, all values are retrieved from the phonetic surname field. These values are saved to Zookeeper (or a central data storage for the running system). The query system then grabs those phonetic values for all the shards. When the system receives a phonetic name query, the name is analyzed to get the phonetic values to search for. Only shards containing at least one of the phonetic values in the query are searched.

If the query requests a "fuzzy" match, referring to an approximate string match that may match phonetically but must also be within a certain edit distance of the match, a constraint such as requiring that at least the first letter match is imposed and only shards containing names starting with said first letter and multi-name shards are searched. The logic described above regarding phonetic searches, e.g., retrieving all phonetic values for all shards, saving the same to a central data storage, and analyzing phonetic values upon receiving a phonetic query, may be performed such that a same first letter and a phonetic match are similarly processed.

The data-sharding systems and methods of embodiments advantageously utilize a database solution separate from the indexes of records (partitioned as described above according to record type, year, and surname, for example) for keeping track of surnames to run the search algorithm, e.g., Solr, on demand. The use of the distinct database solution described herein may be necessitated by a particular volume of data. That is, the distinct database solution described below facilitates the time- and cost-efficient storage, management, and retrieval of records even into the tens or hundreds of billions. Such solutions are particularly valuable in the family history and genealogy space, where tracing and understanding ancestry necessarily entails perusing billions of historical documents and records.

It was surprisingly found that storing the name prefixes and their frequencies in a single table was too slow, so the database solution was adapted to partition records similar to the index—with entries partitioned to shards. The database solution is partitioned according to record type and advantageously facilitates the above-mentioned parallelism, with multiple jobs occurring simultaneously during indexing. It was found that this adaptation reduced the time required for a search operation by over 50%.

The database solution maintains frequency data of name occurrences so as to maintain the index and facilitates dynamic partitioning, with distribution of surnames adapted based on changing/updated frequencies.

In some embodiments, the embodiments of data-sharding systems and methods has or is configured to cooperate with an additional dimension for new and/or updated collections beyond the dimensions of record type, year, and surname. The additional dimension may be in a "staging," "beta," or "live" state, with multiple versions of the index tracked. In some embodiments two major environments are used and tracked: a live version and a staging version, wherein the staging version allows employees of an entity acquiring data or records to preview a collection before it goes live. The distinct database solution simultaneously tracks both the live and the staging versions of the index.

The data-sharding systems and methods embodiments of the disclosure advantageously facilitate dynamic and automatic adjustments to a third or additional dimension of a sharded database such that shards can be kept approximately the same size for minimized operating expenses ("OPEX") and capital expenditures ("CAPEX"). It is thought that because multi-name shards are queried more often than other shards, having more multi-name shards with lower quantities of records indexed thereon improves performance of the data-sharding system and method embodiments. It has also been found that moving multi-name shards to larger hardware instances further facilitates their efficient use.

However, sharding is a zero-sum game, as allocating more shards to multi-name shards leaves fewer shards available to host single-name shards and no-name shards. The optimization algorithm may be based on a greedy algorithmic paradigm, taking the form in some embodiments of Kruskal's Minimum Spanning Tree, Prim's Minimum Spanning Tree, Dijkstra's Shortest Path, Huffman Coding, modifications and/or combinations thereof, or any other suitable algorithm. The optimization algorithm may be configured to treat each shard as a bucket that can only hold a certain number of records. Then the optimization algorithm goes through each prefix and starts filling the first shard. When the next prefix will overflow the shard, the optimization algorithm is configured to move onto the next shard. The optimization algorithm continues until all the prefixes have been used. Where the optimization algorithm correctly estimates the shard distribution (using In some embodiments total records/number of shards), all the shards are used with no prefixes left over.

The optimization algorithm then determines whether moving one prefix from a given shard to the previous and/or the next shard would improve the overall distribution and to what degree such a move would improve the distribution. This process is repeated until no further moves of prefixes to adjacent shards would result in improvements to the distribution. The optimization algorithm may perform this operation on each possible combination of record type and year (where record type and year are the foregoing sharding dimensions), or for any other combination of sharding dimensions.

Solutions for the Bin Packing Problem likewise may be modified and used for the data-sharding embodiments as suitable.

In some embodiments, the number and size of shards corresponding to each of no-name, single-name, and multi-name categories will be further and dynamically optimized to minimize costs and latency.

These and other features of the present disclosure will become better understood regarding the following description, appended claims, and accompanying drawings.

BRIEF DESCRIPTION OF THE DRAWINGS

FIG. 11 is a flowchart of a method for searching the indexed collection of data in accordance with some embodiments.

Figure 1:
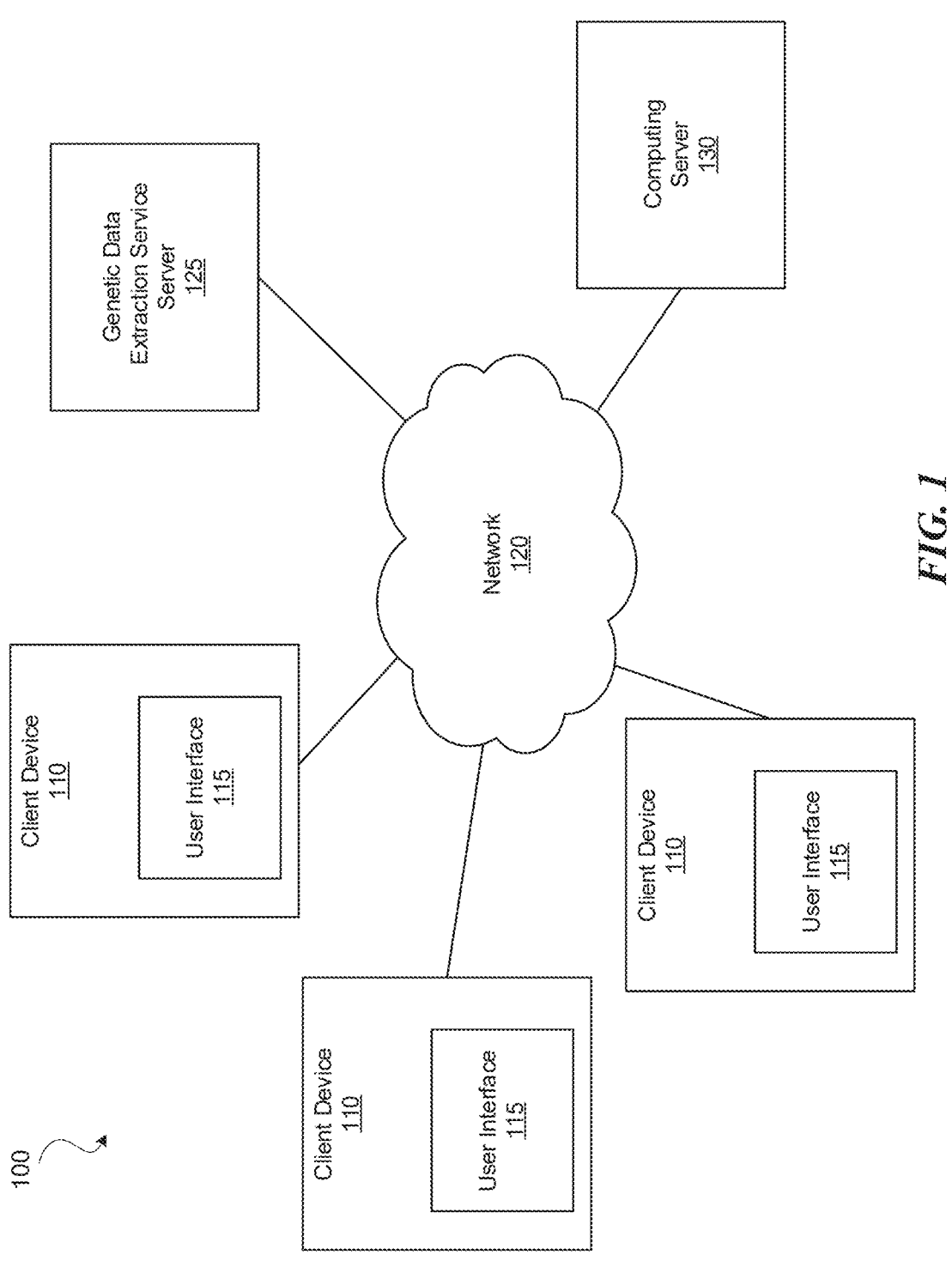
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Although the embodiments of the disclosure are adapted for sharding and searching data, particularly from large databases such as those containing historical documents, the embodiments of the disclosure may also be dimensioned to accommodate different types, shapes and uses of data. For example, the embodiments of the disclosure may be applied to any suitable database, including databases hosting structured, semi-structured, and/or unstructured data, databases of any suitable size and application, combinations and/or modifications thereof, or any other suitable context.

Embodiments of data-sharding systems and methods for cost- and time-efficient record search address shortcomings in the art by providing a logical dimensions for sharding that reduces the number of shards that must be queried and/or scaled in response to a query, thereby reducing the operating and capital cost of searching for a particular record or entry in a database and minimizing or reducing latency of search, even for databases with tens or hundreds of billions of records, such as family history or genealogy services.

In contrast to previous sharding approaches, the data-sharding systems and methods of embodiments advantageously utilize a third dimension, In some embodiments name sharding, to organize the records in a database according to record type, year, and then surname, optionally notated as _surname_. Each shard of the database is now responsible for a range of surnames arranged, In some embodiments, alphabetically. Alternatively, the surnames may be organized in other suitable manners, such as using a hash assigned based on a relation of the surname to a record type. The surname refers to the surname of the main person of interest in a historical record, i.e. the "self" or "ego" surname. In certain family history embodiments, this surname is not extended to relatives such as spouse(s), children, parents.

In some embodiments, the systems and methods may search for maiden names, given (i.e. first) names, or otherwise. That is, there are certain fields that, in some embodiments, are searched when searching other fields. For example, some records have a maiden name field, and when searching for surnames generally, also searching the maiden name field advantageously allows the systems and methods to search the right shard and to capture all relevant results. In some embodiments, the names from maiden name fields are copied into the surname field for relevant name-sharding collections. Similar techniques apply to other fields.

Surname may be particularly useful as it is present in most historical records, but it will be appreciated that the disclosure is by no means limited to surname-only sharding, and alternative and/or additional name-related or other fields may be used. In some embodiments, any suitable combination of any number of fields such as record type, year, surname, first name, birth place, birth date, death place, death date, marriage place, marriage data, or otherwise may be utilized. In some embodiments unrelated to family history and historical records, any suitable combination of sharding dimensions may be utilized.

In some embodiments, the first shard is responsible for names starting with "a" and ending with "arn," the next shard is responsible for names starting with "arn" and ending with "bel," and so forth. Thus, instead of having to search all 50 servers with each query, now the collator can, in response to a query, choose which shards contain relevant records, reducing the number of queries applied to the cluster. The minimum number of shards queried is advantageously reduced from, for example, 50, to one.

This advantageously reduces the load on most of the shards, and by consequence those shards need not be scaled as much or at all, resulting in massive cost savings without compromising the speed of search. Rather, in addition to the cost savings, search speed is surprisingly improved by approximately 40%. It has been further surprisingly found that the existing servers are, as a result, more powerful than necessary, allowing for additional reductions in cost by adjusting the size of the servers.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
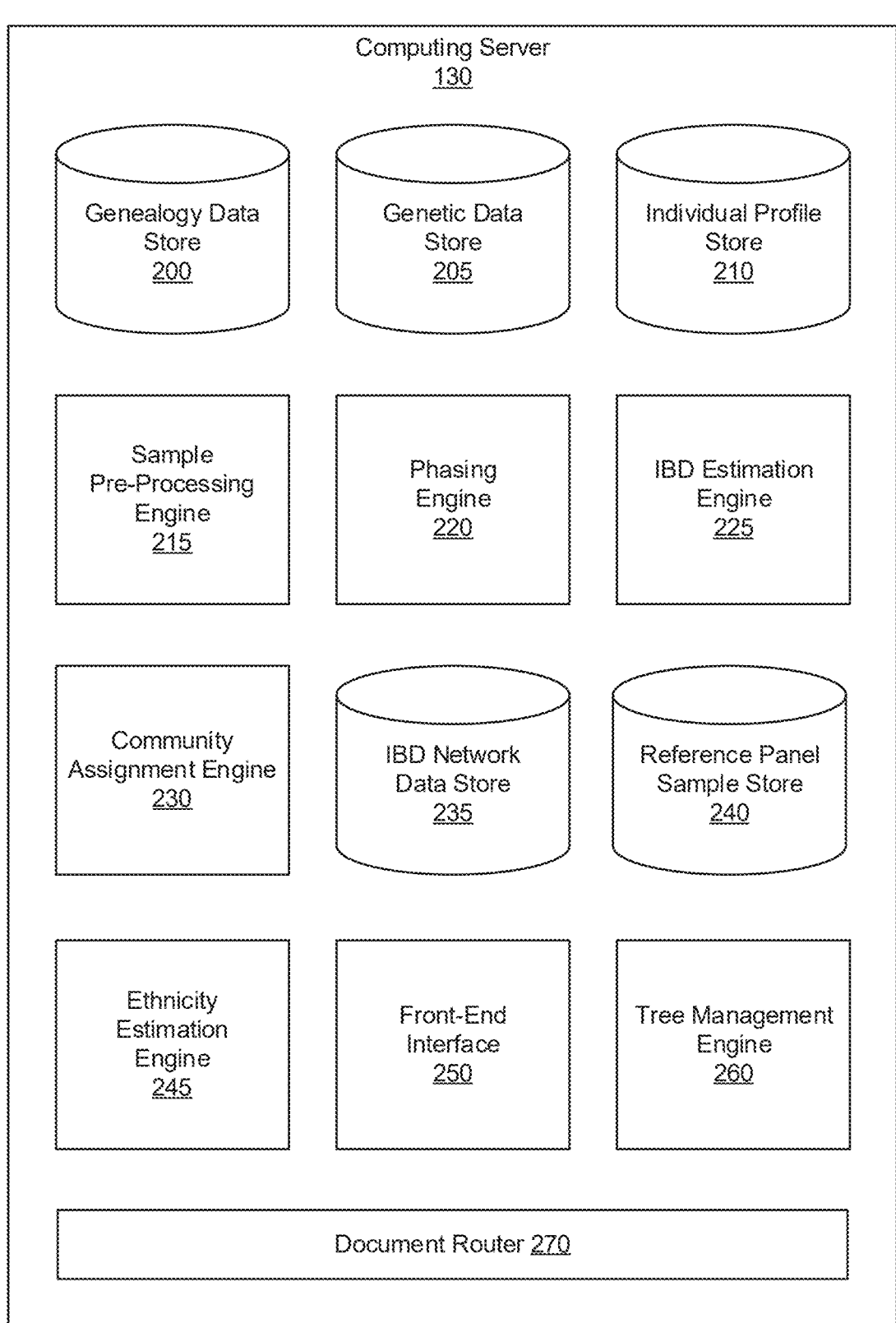
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, and a front-end interface 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. An SNP locus that is single base pair long may also be referred to an SNP site. An SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. The human genome mutation rate is estimated to be $1.1*10^\wedge-8$ per site per generation. This may lead to a variant of approximately every 300 base pairs. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720, 229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample.

The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, describes example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In some embodiments of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and DNA test takers in the potential family trees through one or more machine learning models or other heuristic algorithms. For example, the tree management engine 260 may try putting the target individual in various possible locations in the family tree and determine the highest probability position(s) based on the genetic datasets of the target individual and other DNA test takers in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

The computing server 130 also includes a document router 270 configured to index documents in a data collection, such as (but not limited to) data collection stored in data stores 200, 205, 210, and distribute the indexed documents into multiple shards of databases. When a search query is received from a client device 110, the document router 270 then extracts a search field from the search query, transforms the extracted search field into an index or a prefix, identifies a shard corresponding to the index or the prefix, and search the identified shard. Once the search result is received, the document router 270 then returns the search result back to the client device 110.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

Example Sharding Process Data

Figure 3:
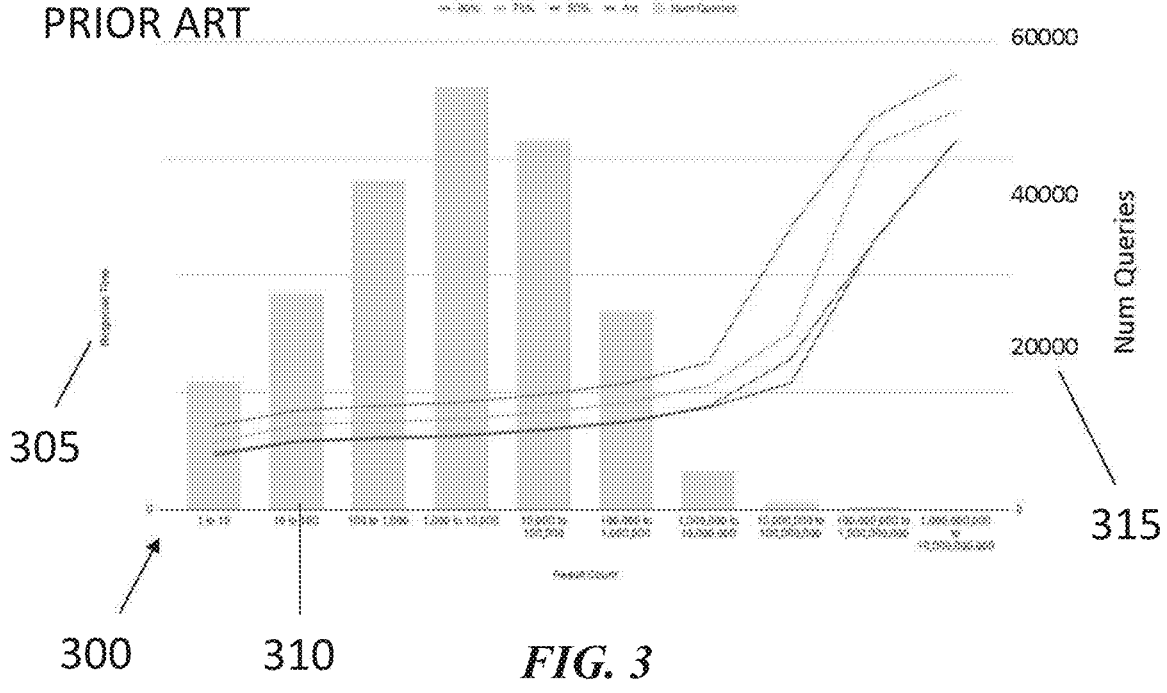
FIG. 3 is a graph showing latency and number of queries as result set size increases using existing data-sharding approaches.

Turning to FIG. 3, a graph 300 of existing sharding approaches shows the response time 305 in ms and the number of queries 315 for results returned per query 310. Latency is a concern as, in some embodiments, a search may return as many as 50× more records per shard than existing approaches (50 corresponding to an embodiment with 50 discrete shards). As seen, in existing sharding approaches the response time 305 for the average, median, 75th percentile, and 90th percentile are stable until returning about 10 million documents at which point it increases dramatically, from approximately 700 ms to between 1700 and 4000 ms.

Figure 4:
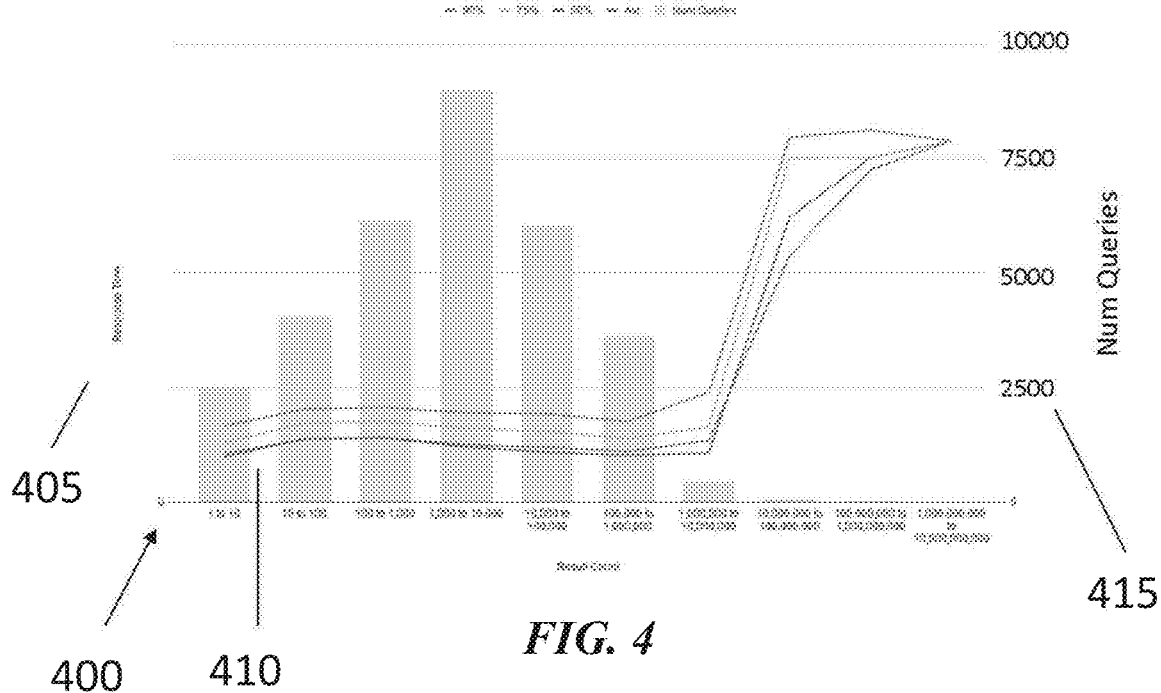
FIG. 4 is a graph showing latency and number of queries for each shard using data-sharding systems and methods for searches on a single collection in accordance with some embodiments.

Turning to FIG. 4, it has been surprisingly found that, despite each shard receiving approximately 10% of the traffic it used to, and accordingly having to return approximately 10× as many results, latency is impacted only negligibly. FIG. 4 shows a graph 400 of data-sharding approaches according to the disclosure for collection searches and shows the response time in ms 405 and the number of queries 415 for results returned per query 410 for each of the average, median, 75th percentile, and 90th percentile. Surprisingly, the latency is even less sensitive to search result volumes; that is, whereas the graph 300 of FIG. 3 shows the latency increasing linearly with results, the graph 400 shows the latency largely flat as results increase. Note, also, that the number of queries has been significantly reduced.

Figure 5:
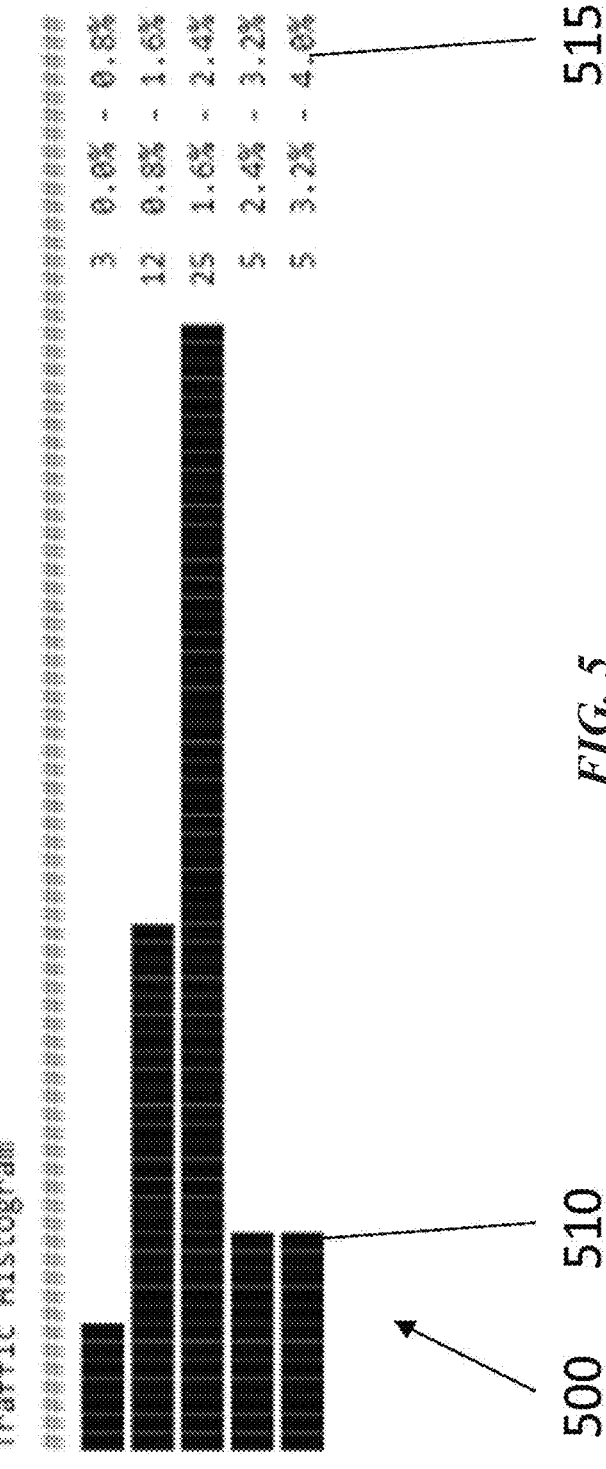
FIG. 5 is a histogram showing traffic across shards for various test queries using data-sharding methods and systems in accordance with some embodiments.

Turning to FIG. 5, a traffic histogram 500 shows the results of 3000 queries executed with a data-sharding system and method according to an embodiment. The traffic histogram 500 shows how often the shards are hit in response to a query compared to existing approaches, with frequency 510 corresponding to the ranges 515. The average value is 2% in a 50-shard scheme, with the "coldest" shards being hit with only 0.5% of the traffic and the "hottest" shards receiving 4% of the traffic. This is a substantial reduction from existing approaches, where the hottest shards receive 16% of the traffic and the coldest shards still receive approximately 2% of the shards. In other words, the disclosed embodiments advantageously facilitate a 75% reduction in traffic to the "hottest" shards. In some embodiments, the results of the traffic histogram 700 are used to reprovision the shards such that "cold" shards are downsized and "hot" shards are scaled up, as the case may be.

Extract and Transform Stages

A pre-processing step or engine of the data-sharding systems and methods, according to some embodiments, includes providing content to the search engine, In some embodiments Apache Solr, in the form of "collections," which may include a set of records from a particular source. While Apache Solr is described, it will be appreciated that the embodiments may be carried out on or in cooperation with alternative search modalities, including but not limited to Elasticsearch™, Algolia™, Coveo™, Yext™, Azure™ Search, IBM™ Watson Discovery, Google™ Cloud Search, Swiftype™, combinations and/or modifications thereof, or any other suitable modality.

The collections may be, as an illustrative example, the 1940 Census, 1950 Census, or Texas Marriage Records. The search engine may process the records of the collections into a form that can be indexed, in what is known as the Extract stage and the Transform stage of embodiments. In order to also shard the records by surname, the distribution of names may be ascertained. In some embodiments this includes keeping track of name frequencies and/or query frequencies. This allows for splitting the records as evenly as possible across shards. This advantageously reduces costs by minimizing the cost of the machines themselves and maximizing the efficiency of the searching operation as it queries pertinent shards. During the Extract stage, names may be normalized.

To initialize the data collection and storage process, each document of a pertinent collection is analyzed to extract surnames from a person of interest, e.g., from a "self," as opposed to a spouse, parent, child, or other relation. The surname of the person of interest is saved as a three-character prefix to a database table. While three-character prefixes have been described, it will be appreciated that any suitable hash, such as a two-character, four-character, five-character, or other-sized prefix may be alternatively used. A three-character prefix may increase precision while the use of a two-character prefix may advantageously reduce latency.

Figure 6:
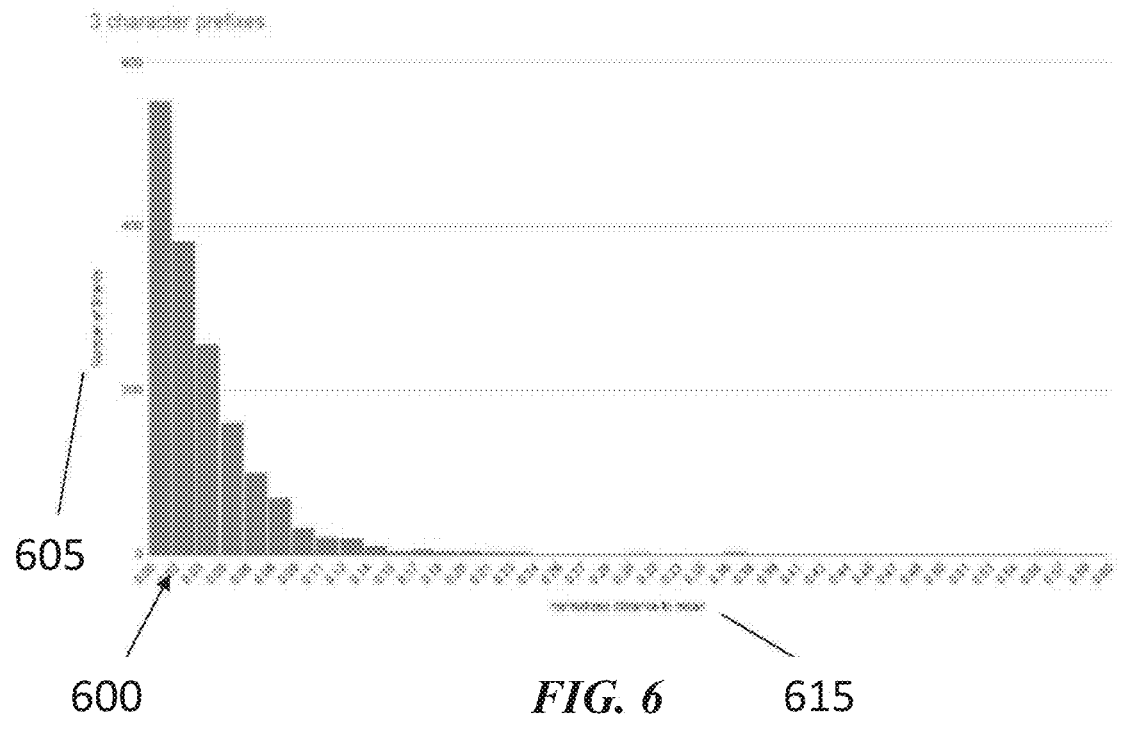
FIG. 6 is a histogram showing percentage distance of a shard's size to an average shard size using three-character surname prefixes in accordance with some embodiments.

Turning to FIG. 6, a histogram 600 shows the percentage distance 615 of a shard's size to the average shard size and the number of shards 605 for each distance 615. The histogram 600 corresponds to the use of three-character prefixes for indexing records according to surnames. As seen, the vast majority of shards are within 0.03 of the normalized distance to mean. Thus, the use of three-character prefixes for name sharding according to some embodiments advantageously facilitates a much more even distribution of records across shards.

Figure 7:
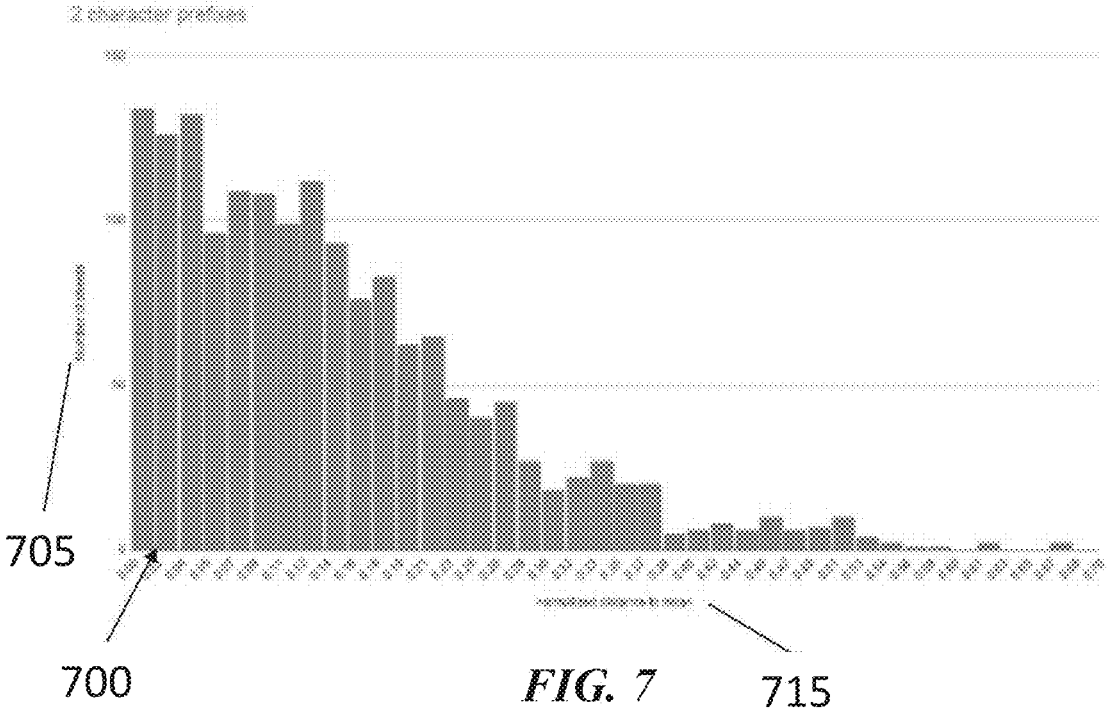
FIG. 7 is a histogram showing percentage distance of a shard's size to an average shard size using two-character surname prefixes in accordance with some embodiments.

Turning to FIG. 7, by contrast, shows a histogram 700 corresponding to the use of two-character prefixes for name sharding. The histogram 700 shows the percentage distance 715 of a shard's size to the average shard size and the number of shards 705 for each distance 715. As seen, two-character prefixes have much greater difficulty in achieving similarly sized shards as far fewer shards are within a short distance, e.g. within 0.03 of the normalized distance to the mean, compared to the three-character prefixes.

In some embodiments, a MapReduce implementation is used for extracting and sorting surnames or other dimensions. Upon identifying a record that does not have a self surname or where multiple and/or conflicting self surnames are recorded, this is recorded in the database table, for example as "no name"- or as "multiple name"—type entries.

Because the process of extracting and saving prefixes of identified surnames is time-consuming, an additional component is added so that the process of analyzing and storing pertinent indexing information from collections is performed incrementally as new collections are published.

When an index is about to be created for a particular searchable combination of collections, e.g., 1800-1850 in combination with marriage records, surname three-character prefixes are extracted from the database for each of the first two dimensions, In some embodiments Solr collections. Such collections include, for example, birth records from 1910-1950, death records from 1880-1895, etc. The surname prefixes corresponding to each of the first two dimensions, i.e. record type and record year, are used as input to an optimization algorithm that produces a definition of what surnames each shard in each Solr collection is responsible for. This step also allocates some shards to records with no names and with multiple surnames. The surnames may be normalized exactly or substantially the same as the search for standardization.

Figure 8A:
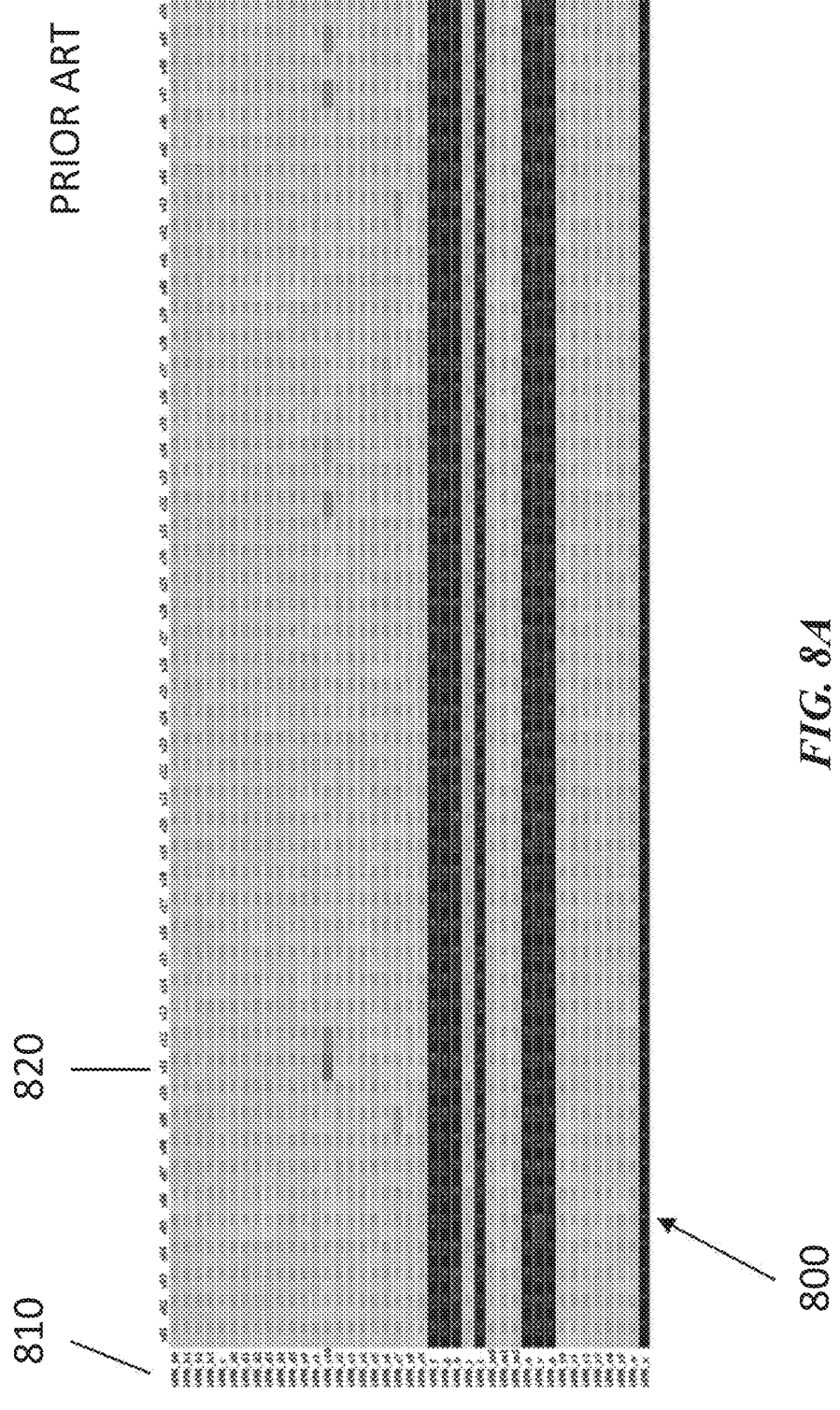
FIG. 8A is a heatmap showing a Solr index according to existing sharding practices.

The existing approach to sharding along first and second dimensions—that is, based on record type and primary year—is shown in FIG. 8A. A heatmap 800 shows an index of records using existing sharding and monitored by heatmap, the index showing all of the shards in the index and how they are performing based on color. Prior to implementing the data-sharding embodiments of the disclosure, the index was logically partitioned by a combination of record type and primary year, as seen at 810 with discrete shards shown at 820. As seen from the heatmap 800, searches within certain record and year combinations 810 hit every shard, driving up the cost and latency and reducing the efficiency of searches performed thereon.

That is, a sharding index of surname prefixes may be determined as described herein for each possible combination of additional or foregoing sharding dimensions. In family history embodiments, a sharding index of surname prefixes is determined for each combination of record type and year that may be searched and according to which records are already sharded. In other embodiments where distinct sharding dimensions are used, a third or additional dimension may be indexed according to each possible combination of foregoing sharding dimensions.

Figure 8B:
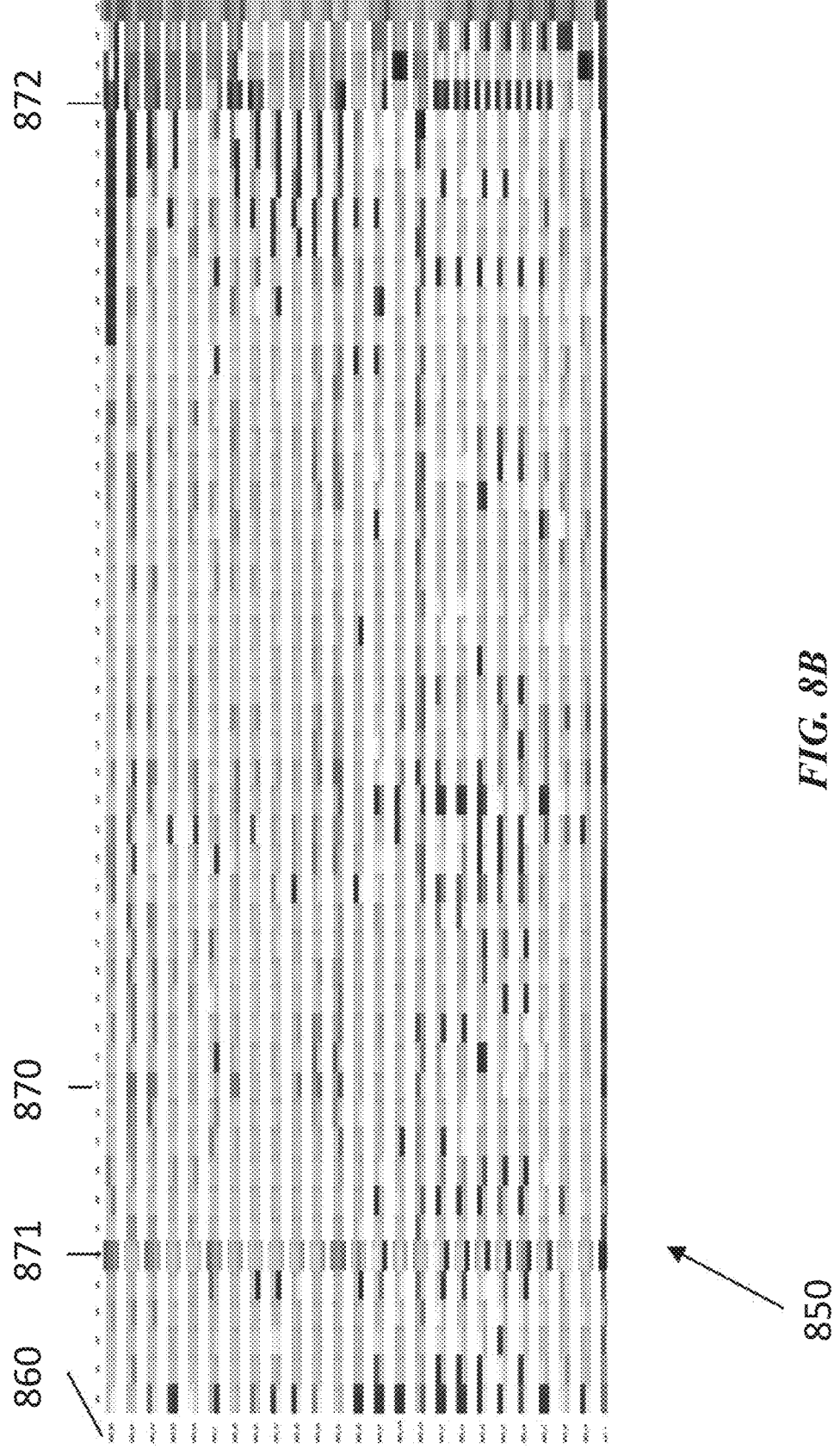
FIG. 8B is a heatmap showing a Solr index in accordance with some embodiments.

Turning to FIG. 8B, a heatmap 850 shows the advantages of the data-sharding embodiments of the present disclosure. The heatmap 850 shows that, in contrast to the heatmap 800, combinations of record type and year 860 are much more-evenly distributed across shards 870. That is, while shard 6 871 and multi-name shards 47-50 872 have scaled to three instances due to traffic, most shards 870 only have two instances—that is, these shards have not been required to scale—and have an even distribution of traffic.

In an alternative embodiment, the optimization algorithm separately indexes records with multiple surnames according to each of the multiple surnames. Such records could, in such embodiments, be stored redundantly on different shards so as to be searchable thereon according to one of the multiple names. An example of a record with multiple surnames is the surname Smith-Jones. In other embodiments, a record may have conflicting information about surnames such that a single surname cannot be determined with certainty, for example indicating Smith in some regards and Jones in other regards.

During the indexing process, there is a specific MapReduce component, the Partitioner, that assigns records to specific shards within a Solr collection. Whereas in previous approaches the Partitioner assigned the records randomly to different shards, a new Partitioner has been created to utilize the sharding definitions obtained as an output from the optimization algorithm described above. Using the sharding definitions, the new Partitioner assigns records to shards not randomly but rather according to an improved distribution that utilizes the existing shards in more time- and cost-efficient manner.

For example, the Partitioner may distribute the surname prefixes to different shards to achieve an even distribution (i.e. each shard contains approximately the same number of entries) based on frequency of content or queries. To this end the Partitioner may target a certain number of records per shard. The Partitioner may distribute the records such that each shard has within ±1% of the number of records of an average or median value. In some embodiments, single-name shards are maintained within a threshold variance such each of the single-name shards having within ±1% of the number of records of the average or median value for single-name shards, while multi-name shards and no-name shards are separately partitioned.

That is, a record is first passed through the same process that it would go through before the final indexing, including tokenization in which the surname is broken up into pieces and any requisite or suitable transformations. For example, a standard tokenizer may be used within values along with other filters, where terms are broken at whitespace and punctuation with only a few exceptions. Thus, "Smith Jones" becomes "Smith," "Jones"; "Smith-Jones" becomes "Smith," "Jones"; exceptions include not counting the following tokens, among other possibilities, as separate values: o, mc, mc, mac, mac, von, van, de, da, du, la, and le. Thus "von Smith" becomes "Smith"; "von" becomes "von"; "da von smith" becomes "smith", and so forth.

Based on the result of the above-described process, a final result may be: the record is determined to have no name and is therefore randomly assigned to a "no-name" shard; the record is determined to have one name and is assigned to the shard corresponding to a range that includes the one name; or the record is determined to have more than one name, wherein if all of the multiple names would get assigned to the same shard if processed separately, the record is assigned to the same shard corresponding to the names, and wherein if all of the multiple names would not get assigned to the same shard if processed separately, the record is randomly assigned to one of the "multi-name" shards. The indexing process can be a parallelized process with numerous jobs occurring simultaneously across the shards.

The database may be updated as a collection is updated with new data. The existing collection is deleted entirely from the index and then records from the updated collection are added to the index one at a time. This advantageously replaces the previous process in which new records were added to the shards randomly; by contrast, the new records are added to an appropriate name shard, thereby allowing the depicted embodiments of data-sharding systems and methods to accommodate updated data. The embodiments of data-sharding systems and methods may determine, upon data being uploaded or stored, whether the data is a new collection entirely or an updated version of an existing collection.

Figure 9A:
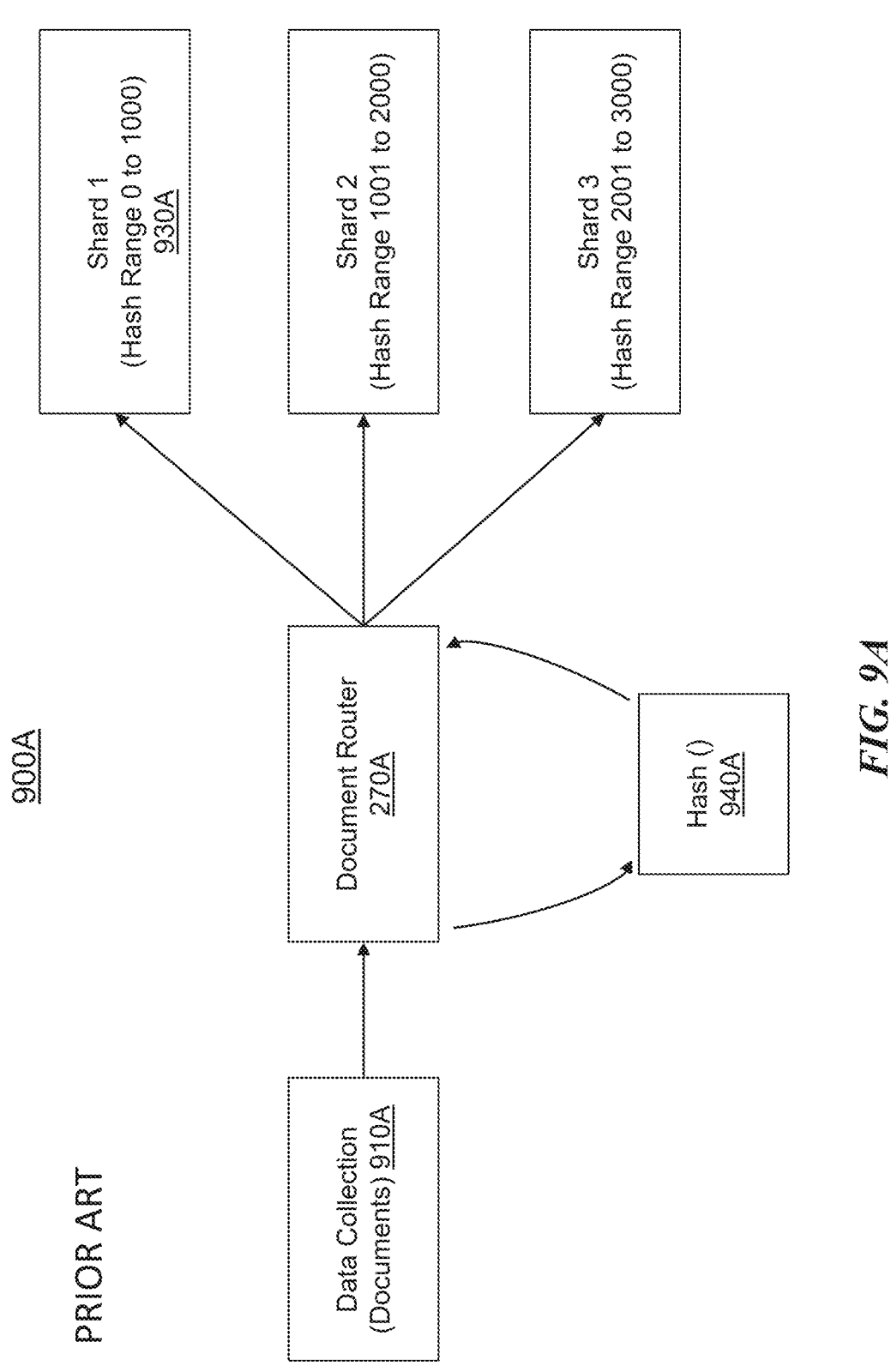
FIG. 9A is a diagram showing existing sharding practices.

Turning now to FIG. 9A, a diagram 900A shows existing sharding approaches, where a document 910A is provided to a document router 270A, e.g., a Solr document router, and then split into one or more discrete shards 820 based on a received hash from a hash function 940A or generator that may make use of a hashing algorithm. The shards 820 may correspond to a distinct hash range. Based on the random operation or effectively random operation of the hash function 940A (for example, each document may be sequentially assigned a hash without regard to a dimension, e.g., surname), the shards 820 contain a random distribution of documents requiring that each is queried and the associated costs incurred. This is particularly pertinent in batch updates to a collection.

In some embodiments of the present disclosure, the specific collection shard may be explicitly specified when performing updates to a collection. That is, when updating a collection, records are sent to the appropriate shard to be inserted.

Figure 9B:
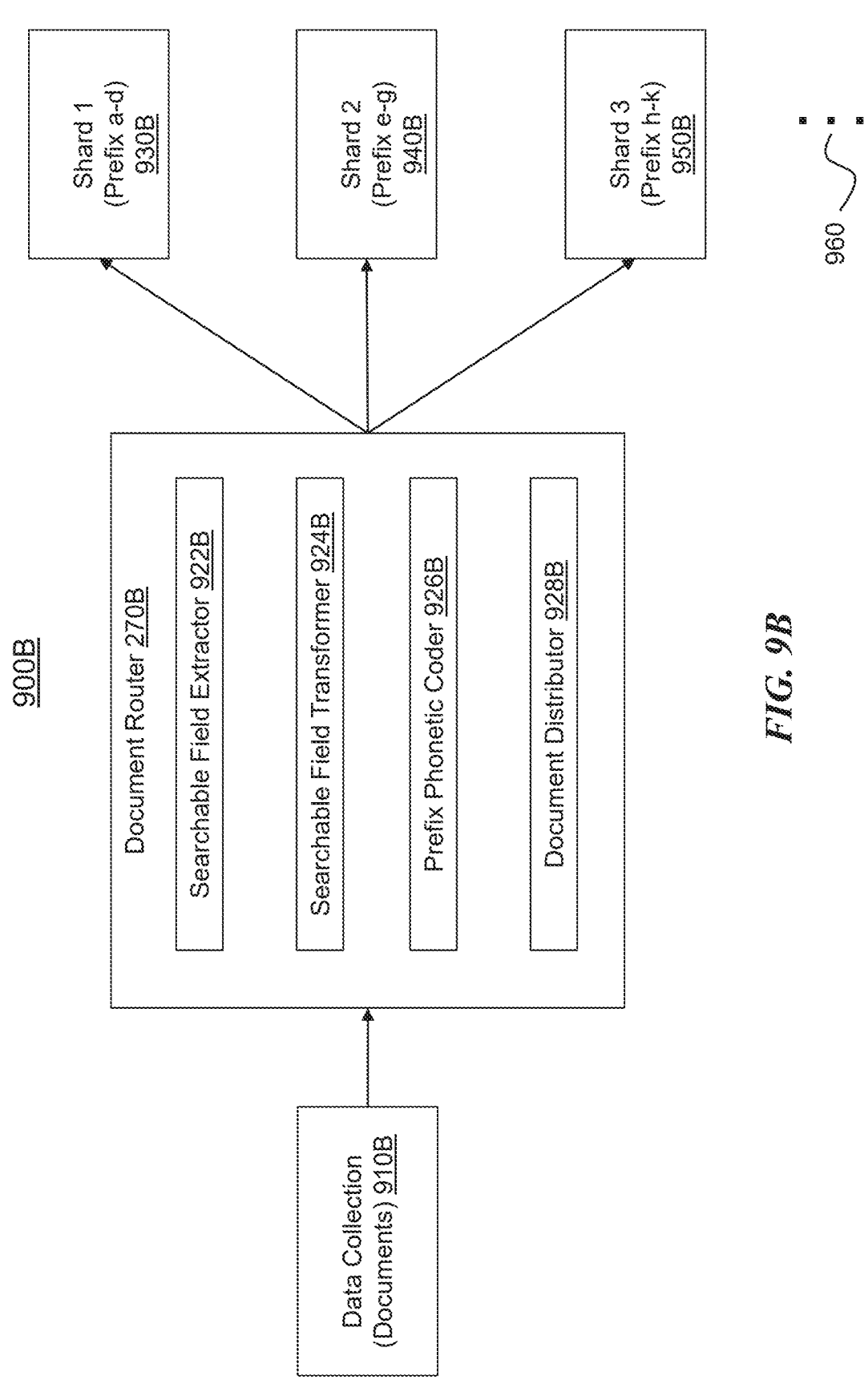
FIG. 9B is a diagram showing an example sharding practice in accordance with some embodiments.

FIG. 9B is a diagram 900B illustrating a sharding approach according to an embodiment described herein. As illustrated in FIG. 9B, a document router 270B includes a searchable field extractor 922B, a searchable field transformer 924B, and a document distributor 928B. The searchable field extractor 922B is configured to extract searchable fields from documents 910B contained in a data collection. The searchable field transformer 924B is configured to transform the extracted searchable fields into prefixes. The document distributor 928B is configured to distribute the documents into multiple shards 930B, 940B, 950B based on their prefixes. For example, in some embodiments, the prefix is based on a first few letters of surnames. As illustrated, prefixes a-d are distributed to shard 1 930B, prefixes e-g are distributed to shard 2 940B, and prefixes h-k are distributed to shard 3 950B. The ellipsis 960 represents that there may be any number of shards that receive documents that correspond to a range of prefixes.

In some embodiments, the document router 270B also includes a prefix phonetic coder 926B configured to code prefixes into phonetic spellings. When users search a surname or other search terms, they may not know the exact spelling of that surname or the term. Thus, users often enter phonetic spellings of surnames or other type of search terms. The prefix phonetic coder 926B maps the prefixes to phonetic spellings. As such, when a phonetic search term is received, the phonetic search term is then coded to one or more prefixes, which can then be searched in a corresponding shard.

The above-mentioned procedures advantageously facilitate an improved retrieval process. When a search query is received, the search engine must decide which shards to query. As before, any information about record type and years (from the query) can be used to narrow down the number of Solr collections to search. The data-sharding systems and methods of embodiments provide a new engine for choosing which shards within a particular Solr collection to search. The surname in the received search query is sent through a process analogous to the above-described process (i.e. tokenization and other suitable transformations), and then processed as described below:

In some embodiments, if the query does not include a surname, all shards are searched. If the query has a surname and the query requires that the surname be matched exactly as specified, only the shard containing that surname and any shards with multi-name records are searched. If the query is searching for a surname using wildcards, all shards other than no-name shards are searched.

In some embodiments, if the query has a surname and requests phonetic matches (i.e. "sounds like" matches), all shards other than no-name shards are searched. In some embodiments, each index may be analyzed for possible phonetic variants of a search query identified during the indexing process such that only those shards containing possible phonetic variants that need be searched when a user searches for phonetic matches.

In some embodiments, the systems and methods of data-sharding embodiments perform phonetic searches by filtering out phonetic codes that appear in fewer than a predetermined number of documents, whereas in other embodiments the phonetic search is performed for all phonetic codes. Searching for phonetic variants identified during the indexing process advantageously reduces the number of shards queried on phonetic searches when using two-character surnames from 55% on average to 33% on average, from 52% median to 27% median, from 61% on the $70^{th}$ percentile to 35%, and from 93% on the $90^{th}$ percentile (i.e. the worst ten percent of names) to 46%. This also reduces the number of shards queried on phonetic searches when using three-character surnames from 50% on average to 28% on average, from 45% median to 23% median, from 55% on the $70^{th}$ percentile to 28%, and from 91% on the $90^{th}$ percentile (i.e. the worst ten percent of names) to 36%.

In some embodiments, to determine what phonetic codes are present in each shard, an additional indexing step that runs after the shard's index is created is provided with a utility that analyzes the phonetic field values. Alternatively, when a shard loads, it analyzes its own index and saves that data to the database solution, e.g., to ZooKeeper, and this data is utilized during searching.

If the query requests a "fuzzy" match, referring to an approximate string match that may match phonetically but must also be within a certain edit distance of the match, a constraint such as requiring that at least the first letter match is imposed and only shards containing names starting with said first letter and multi-name shards are searched. Fuzzy searches may also be restricted using the above-described technique, i.e. the intersection of phonetically matched shards and those shards with names with the same first character.

The data-sharding systems and methods of embodiments advantageously utilize a database solution separate from the indexes of records (partitioned as described above according to record type, year, and surname, for example) for keeping track of surnames to run the search algorithm, e.g., Solr, on demand. The use of the distinct database solution described herein may be necessitated by a particular volume of data. That is, the distinct database solution described below facilitates the time- and cost-efficient storage, management, and retrieval of records even into the tens or hundreds of billions. Such solutions are particularly valuable in the family history and genealogy space, where tracing and understanding ancestry necessarily entails perusing billions of historical documents and records. In some embodiments, the database solution is ZooKeeper integrated with Solr-Cloud, but the disclosure is not limited thereto.

It was surprisingly found that storing the database solution for tracking the additional sharding dimension(s) in a single table was too slow, so the database solution was adapted to partition records similar to the index—with entries partitioned to shards. The database solution is partitioned according to record type and advantageously facilitates the above-mentioned parallelism, with multiple jobs occurring simultaneously during indexing. It was found that this adaptation reduced the time required for a search operation by over 50%.

The database solution maintains frequency data of name occurrences so as to maintain the index and facilitates dynamic partitioning, with distribution of surnames adapted based on changing/updated frequencies.

In some embodiments, the embodiments of data-sharding systems and methods has or is configured to cooperate with an additional dimension for new and/or updated collections beyond the dimensions of record type, year, and surname. The additional dimension may be in a "staging," "beta," or "live" state, with multiple versions of the index tracked. In some embodiments two major environments are used and tracked: a live version and a staging version, wherein the staging version allows employees of an entity acquiring data or records to preview a collection before it goes live. The distinct database solution simultaneously tracks both the live and the staging versions of the index.

The data-sharding systems and methods embodiments of the disclosure advantageously facilitate dynamic and automatic adjustments to a third or additional dimension of a sharded database such that shards can be kept approximately the same size for minimized operating expenses ("OPEX") and capital expenditures ("CAPEX"). It has been found that because multi-name shards are queried more often than other shards, having more multi-name shards with lower quantities of records indexed thereon. It has also been found that moving multi-name shards to larger hardware instances further facilitates their efficient use.

However, sharding is a zero-sum game, as allocating more shards to multi-name shards leaves fewer shards available to host single-name shards and no-name shards. The optimization algorithm may be based on a greedy algorithmic paradigm, taking the form in some embodiments of Kruskal's Minimum Spanning Tree, Prim's Minimum Spanning Tree, Dijkstra's Shortest Path, Huffman Coding, modifications and/or combinations thereof, or any other suitable algorithm.

In some embodiments, the number and size of shards corresponding to each of no-name, single-name, and multi-name categories will be further and dynamically optimized to minimize costs and latency.

Figure 10:
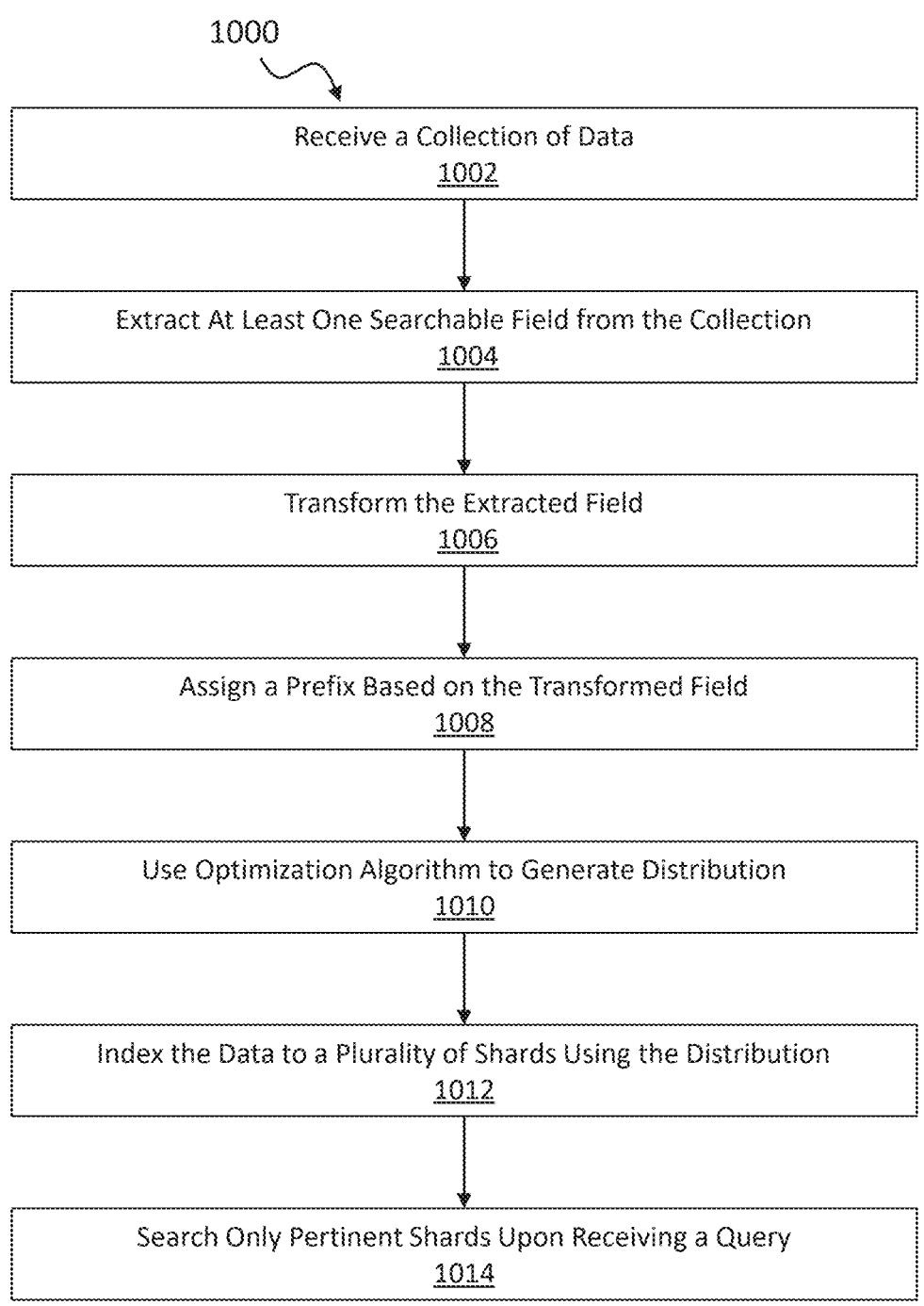
FIG. 10 is a flowchart of a method for indexing a collection of data in accordance with some embodiments.

FIG. 10 illustrates an exemplary method 1000 for data-sharding. The method 1000 may be performed by a system, such as the computer server 130, comprising a processor and a non-transitory computer readable storage medium having instructions encoded thereon. The method 1000 includes a step 1002 of receiving a collection of data, such as a collection of historical records, such as Texas Marriage Records for the years 1800-1850. A step 1004 includes extracting at least one searchable field from the collection, such as a surname field. Any field or combination of fields may be extracted, including multiple name fields, record type, record creation year, record publication year, occupation, field of study, publication (i.e. journal), inventor name, record status, language, processing agency or office, or any other field. This may be performed by optical character recognition ("OCR") techniques available to persons skilled in the art. A step 1006 involves transforming the extracted field data, for example by normalizing the data. This may include removing accents from names and transliterating any non-English characters into English characters according to a predetermined transliteration.

A step 1008 includes assigning a value or hash such as a prefix based on the transformed field. The prefix may be a three-character prefix, such as the first three letters of a surname field. A step 1010 includes using an optimization algorithm to generate a distribution of the prefix across a plurality of shards, in some embodiments with a distinction between categories of shards for corresponding categories identified among the extracted field. For example, if no data is provided or if multiple conflicting data are provided for a record in the extracted field, no-data and multiple-data shards can be provided. A step 1012 includes indexing the data to the plurality of shards using the determined distribution. Indexing records as described reduces the scale of the shards and the number of shards that a query must access at a step 1014; that is, only pertinent shards are searched when receiving queries using that extracted field, rather than having to search all shards. In some embodiments, the database is sharded previously according to record type and/or year.

FIG. 11 illustrates an exemplary method 1100 for searching a sharded data system, which corresponds to the step 1014 of FIG. 10. The method 1100 includes receiving 1102 a search query from a client device, and a step 1104 of extracting at least one searchable field from the search query. The extracted searchable field is then transformed 1106 to a value or hash such as a prefix. In some embodiments, transforming 1106 the extracted searchable field to a prefix includes determining 1108 the searchable field includes a phonetic search field, mapping 1110 the phonetic search field to one or more possible spellings, and extracting 1112 a prefix from at least one of the one or more possible spellings. The method 1100 further includes identifying 1114 an indexed shard corresponding to the prefix, searching 1116 the identified indexed shard, and returning 1118 a search result to the client device.

Computing Machine Architecture

Figure 12:
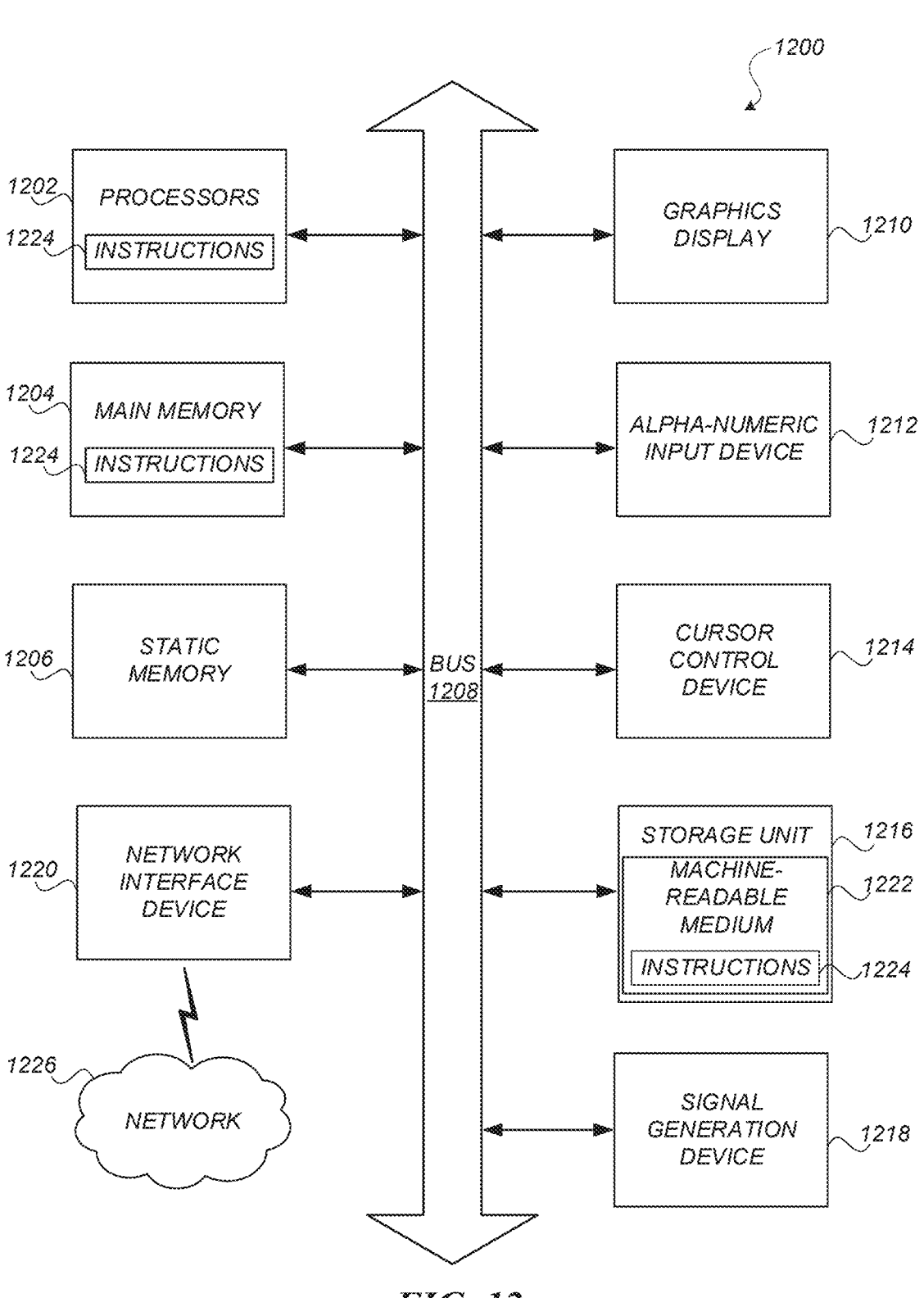
FIG. 12 is a block diagram of an example computing device, in accordance with some embodiments.

FIG. 12 is a block diagram illustrating components of an example computing machine that is capable of reading instructions from a computer-readable medium and execute them in a processor (or controller). A computer described herein may include a single computing machine shown in FIG. 12, a virtual machine, a distributed computing system that includes multiple nodes of computing machines shown in FIG. 12, or any other suitable arrangement of computing devices.

By way of example, FIG. 12 shows a diagrammatic representation of a computing machine in the example form of a computer system 1200 within which instructions 1224 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 12 may correspond to any software, hardware, or combined components shown in FIGS. 1 and 2, including but not limited to, the client device 110, the computing server 130, and various engines, interfaces, terminals, and machines shown in FIG. 2. While FIG. 12 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1224 that specify actions to be taken by that machine. Further, while only a single machine is illustrated, the term "machine" and "computer" may also be taken to include any collection of machines that individually or jointly execute instructions 1224 to perform any one or more of the methodologies discussed herein.

The example computer system 1200 includes one or more processors 1202 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computer system 1200 may also include a memory 1204 that store computer code including instructions 1224 that may cause the processors 1202 to perform certain actions when the instructions are executed, directly or indirectly by the processors 1202. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1202 and reduces the space required for the memory 1204. For example, the database processing techniques and machine learning methods described herein reduce the complexity of the computation of the processors 1202 by applying one or more novel techniques that simplify the steps in training, reaching convergence, and generating results of the processors 1202. The algorithms described herein also reduces the size of the models and datasets to reduce the storage space requirement for memory 1204.

The performance of certain operations may be distributed among more than one processor, not only residing within a single machine, but deployed across a number of machines. In some example embodiments, the one or more processors or processor-implemented engines may be located in a single geographic location (e.g., within a home environment, an office environment, or a server farm). In other example embodiments, one or more processors or processor-implemented engines may be distributed across a number of geographic locations. Even though in the specification or the claims may refer some processes to be performed by a processor, this should be construed to include a joint operation of multiple distributed processors.

The computer system 1200 may include a main memory 1204, and a static memory 1206, which are configured to communicate with each other via a bus 1208. The computer system 1200 may further include a graphics display unit 1210 (e.g., a plasma display panel (PDP), a liquid crystal display (LCD), a projector, or a cathode ray tube (CRT)). The graphics display unit 1210, controlled by the processors 1202, displays a graphical user interface (GUI) to display one or more results and data generated by the processes described herein. The computer system 1200 may also include alphanumeric input device 1212 (e.g., a keyboard), a cursor control device 1214 (e.g., a mouse, a trackball, a joystick, a motion sensor, or other pointing instruments), a storage unit 1216 (a hard drive, a solid-state drive, a hybrid drive, a memory disk, etc.), a signal generation device 1218 (e.g., a speaker), and a network interface device 1220, which also are configured to communicate via the bus 1208.

The storage unit 1216 includes a computer-readable medium 1222 on which is stored instructions 1224 embodying any one or more of the methodologies or functions described herein. The instructions 1224 may also reside, completely or at least partially, within the main memory 1204 or within the processor 1202 (e.g., within a processor's cache memory) during execution thereof by the computer system 1200, the main memory 1204 and the processor 1202 also constituting computer-readable media. The instructions 1224 may be transmitted or received over a network 1226 via the network interface device 1220.

While computer-readable medium 1222 is shown in an example embodiment to be a single medium, the term "computer-readable medium" should be taken to include a single medium or multiple media (e.g., a centralized or distributed database, or associated caches and servers) able to store instructions (e.g., instructions 1224). The computer-readable medium may include any medium that is capable of storing instructions (e.g., instructions 1224) for execution by the processors (e.g., processors 1202) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, and (6) U.S. Patent Publication Application No., entitled "Linking Individual Datasets to a Database," US2021/0216556, published on Jul. 15, 2021.

What is claimed is:

1. A computer-implemented method, comprising:
in response to receiving a search query from a client device, accessing a name index partitioned across a plurality of name shards hosting respective portions of the name index, wherein the respective portions correspond to text characters of individual names;
extracting, based on determining that the search query indicates an individual name, a phonetic searchable field from the search query;
accessing, based on mapping the phonetic searchable field to a prefix comprising a threshold number of characters of the individual name, a name shard from among the plurality of name shards that hosts a respective portion of the name index that includes individual names corresponding to the prefix; and
generating, for display on the client device, a search result by querying the name shard corresponding to the individual name indicated by the search query.

2. The computer-implemented method of claim 1, wherein accessing the name shard comprises determining, based on the text characters associated with each of the plurality of name shards, that the prefix corresponds to text characters assigned to the name shard.

3. The computer-implemented method of claim 2, wherein accessing the name shard further comprises:
determining that the search query further indicates a first record type and a second record type corresponding to the individual name; and
identifying a first name shard among the plurality of name shards corresponding to the first record type and a second name shard among the plurality of name shards corresponding to the second record type, wherein the first name shard and the second name shard also host portions of the name index corresponding to text characters of the prefix.

4. The computer-implemented method of claim 1, wherein generating the search result comprises searching only the name shard corresponding to the individual name from among the plurality of name shards.

5. The computer-implemented method of claim 1, further comprising:
receiving an additional search query;
determining that the additional search query does not indicate an individual name; and
based on determining that the additional search query does not indicate an individual name, searching the plurality of name shards to identify records corresponding to the additional search query.

6. The computer-implemented method of claim 1, wherein accessing the name shard comprises identifying, from among the plurality of name shards, a multi-name shard corresponding to the individual name, wherein the multi-name shard hosts a portion of the name index for records of individuals with multi-names.

7. The computer-implemented method of claim 1, wherein accessing the name shard further comprises:
determining a phonetic match for the prefix; and
identifying, from among the plurality of name shards, an additional name shard hosting a portion of the name index that includes records corresponding to the phonetic match of the prefix.

8. A system comprising:
at least one processor; and
one or more memory devices coupled to the at least one processor, the one or more memory devices storing instructions that, when executed by the at least one processor, cause the at least one processor to:
in response to receiving a search query from a client device, access a name index partitioned across a plurality of name shards hosting respective portions of the name index, wherein the respective portions correspond to text characters of individual names;
extract, based on determining that the search query indicates an individual name, a phonetic searchable field from the search query;
access, based on mapping the phonetic searchable field to a prefix comprising a threshold number of characters of the individual name, a name shard from among the plurality of name shards that hosts a respective portion of the name index that includes individual names corresponding to the prefix; and
generate, for display on the client device, a search result by querying the name shard corresponding to the individual name indicated by the search query.

9. The system of claim 8, wherein the one or more memory devices store further instructions that, when executed by the at least one processor, cause the at least one processor to access the name shard by identifying the name shard by determining, based on the text characters associated with each of the plurality of name shards, that the prefix corresponds to text characters assigned to the name shard.

10. The system of claim 9, wherein the one or more memory devices store further instructions that, when executed by the at least one processor, cause the at least one processor to access the name shard by:
determining that the search query further indicates a first record type and a second record type corresponding to the prefix; and identifying a first name shard among the plurality of name shards corresponding to the first record type and a second name shard among the plurality of name shards corresponding to the second record type, wherein the first name shard and the second name shard also host portions of the name index corresponding to text characters of the prefix.

11. The system of claim 8, wherein the one or more memory devices store further instructions that, when executed by the at least one processor, cause the at least one processor to generate the search result by searching only the name shard corresponding to the individual name from among the plurality of name shards.

12. The system of claim 11, wherein the one or more memory devices store further instructions that, when executed by the at least one processor, cause the at least one processor to:

receive an additional search query;

determine that the additional search query does not indicate an individual name; and based on determining that the additional search query does not indicate an individual name, search the plurality of name shards to identify records corresponding to the additional search query.

13. The system of claim 8, wherein the one or more memory devices store further instructions that, when executed by the at least one processor, cause the at least one processor to access the name shard by identifying, from among the plurality of name shards, a multi-name shard corresponding to the individual name, wherein the multi-name shard hosts a portion of the name index for records of individuals with multi-names.

14. The system of claim 8, wherein the one or more memory devices store further instructions that, when executed by the at least one processor, cause the at least one processor to access the name shard by:

determining a phonetic match for the prefix of the search query; and identifying, from among the plurality of name shards, an additional name shard hosting a portion of the name index that includes records corresponding to the phonetic match of the prefix.

15. A non-transitory computer readable medium storing instructions which, when executed by at least one processor, cause the at least one processor to:

in response to receiving a search query from a client device, access a name index partitioned across a plurality of name shards hosting respective portions of the name index, wherein the respective portions correspond to text characters of individual names;

extract, based on determining that the search query indicates an individual name, a phonetic searchable field from the search query;

access, based on mapping the phonetic searchable field to a prefix comprising a threshold number of characters of the individual name, a name shard from among the plurality of name shards that hosts a respective portion of the name index that includes individual names corresponding to the prefix; and generate, for display on the client device, a search result by querying the name shard corresponding to the individual name indicated by the search query.

16. The non-transitory computer readable medium of claim 15, further storing instructions that, when executed by the at least one processor, cause the at least one processor to access the name shard by determining, based on the text characters associated with each of the plurality of name shards, that the prefix corresponds to text characters assigned to the name shard.

17. The non-transitory computer readable medium of claim 16, further storing instructions that, when executed by the at least one processor, cause the at least one processor to access the name shard by:

determining that the search query further indicates a first record type and a second record type corresponding to the individual name; and identifying a first name shard among the plurality of name shards corresponding to the first record type and a second name shard among the plurality of name shards corresponding to the second record type, wherein the first name shard and the second name shard also host portions of the name index corresponding to text characters of the prefix.

18. The non-transitory computer readable medium of claim 15, further storing instructions that, when executed by the at least one processor, cause the at least one processor to generate the search result by searching only the name shard corresponding to the individual name from among the plurality of name shards.

19. The non-transitory computer readable medium of claim 15, further storing instructions that, when executed by the at least one processor, cause the at least one processor to:

receive an additional search query;

determine that the additional search query does not indicate an individual name; and based on determining that the additional search query does not indicate an individual name, search the plurality of name shards to identify records corresponding to the additional search query.

20. The non-transitory computer readable medium of claim 15, further storing instructions that, when executed by the at least one processor, cause the at least one processor to access the name shard by identifying, from among the plurality of name shards, a multi-name shard corresponding to the individual name, wherein the multi-name shard hosts a portion of the name index for records of individuals with multi-names.

* * * * *